Oct. 31, 1967         R. A. KIRBY         3,350,629
VOLTAGE REGULATOR
Filed Oct. 13, 1964
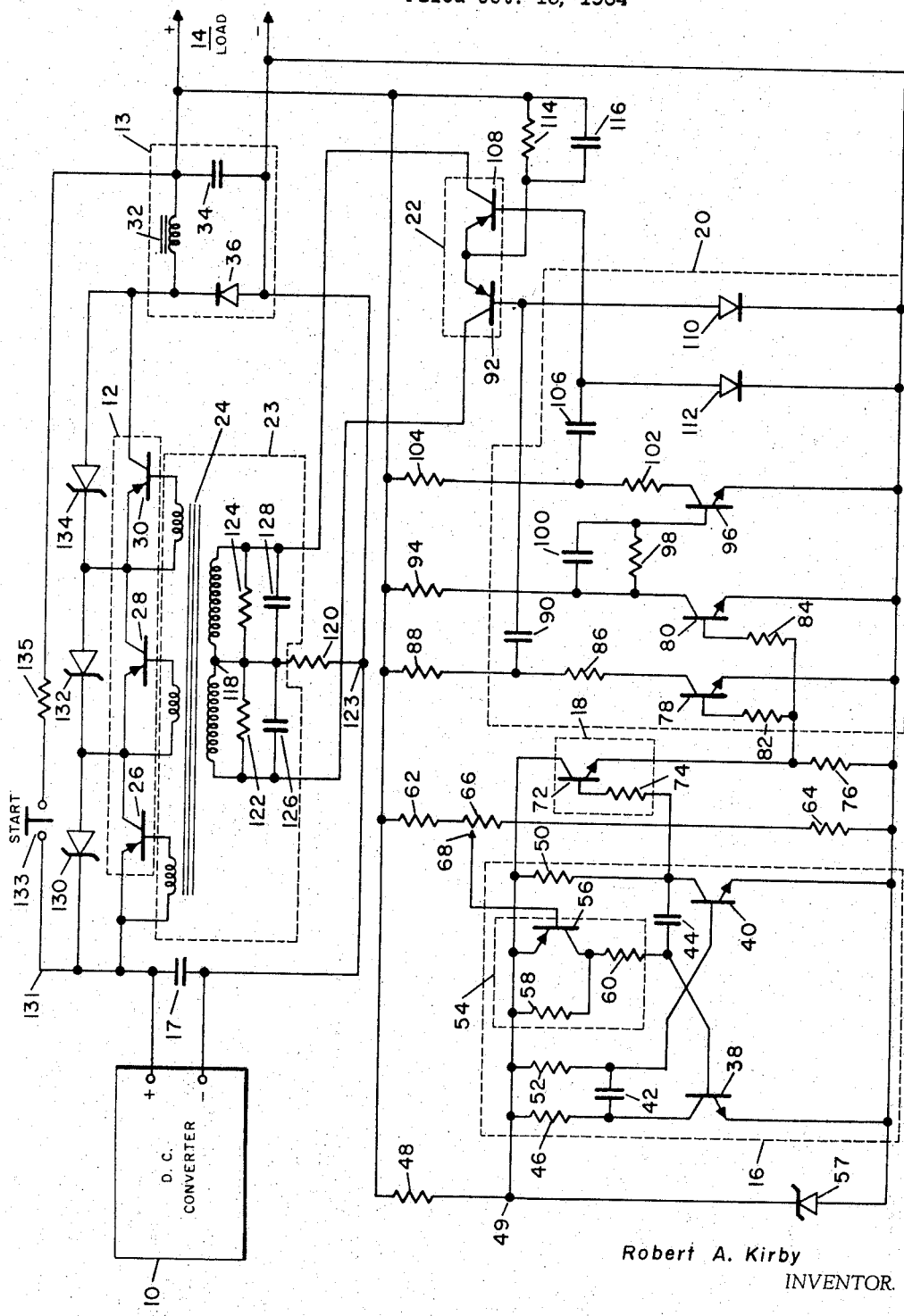
Robert A. Kirby
INVENTOR.
BY John D. Gassett
ATTORNEY

United States Patent Office 3,350,629
Patented Oct. 31, 1967

3,350,629
VOLTAGE REGULATOR
Robert A. Kirby, Tulsa, Okla., assignor, by mesne assignments, to Esso Production Research Company, Houston, Tex., a corporation of Delaware
Filed Oct. 13, 1964, Ser. No. 403,453
6 Claims. (Cl. 323—18)

ABSTRACT OF THE DISCLOSURE

High-efficiency voltage regulator system includes a plurality of switching transistors connected in series between a DC source and a load, a filter for smoothing the output voltage of the system, and a multivibrator, the duty cycle of which is controlled by the filtered output voltage. A multifilar transformer is included in a circuit coupling the output of the multivibrator to the emitter base circuit of each of the transistors to permit simultaneous switching of the transistors substantially instantaneously between "on" and "off" conditions.

This invention concerns a voltage regulator for an electrical power system. It especially concerns a switching circuit-type voltage regulator.

A basic object of this invention is to provide a voltage regulator whereby an unregulated DC supply source of electrical power is supplied to a load at a given voltage level. It is a further object to provide a switching voltage-type regulator which maintains a preset output voltage independent, within limit, of voltage input and power demand.

In a preferred embodiment of this invention, the regulator is a pulse-width modulated system in which the pulses of high voltage are switched from a voltage converter output into an inductance-capacitance filter to maintain a constant lower voltage output. When the power demand increases the pulses become wider and, conversely, when the power demand decreases the pulses become narrower. Switching transistors are used to switch the high voltage "off" and "on" in the pulse-type operation. The use of switching transistors keeps the power loss due to switching very low.

In this invention switching transistors are connected in series and are driven by a transformer whose secondary windings are coupled to the bases of the switching transistors by multifilar output windings. In a preferred embodiment, a push-pull-type transformer-driver is used to drive the transformer. The transformer-driver is controlled by a free running multivibrator. Means are provided to vary the ratio of "on" to "off" time of the free running multivibrator in accordance with variations of the output voltage of the regulated output.

An astable or free running multivibrator has no stable state. It is commonly used as a square wave generator. A typical free running multivibrator has two switching transistors. The amount of time which one transistor conducts is normally determined by the values of an external base resistance and a coupling capacitor of the second transistor. The multivibrator is said to be "on" when the second transistor is "off" or nonconducting. The "off" time of a transistor in a multivibrator circuit is that time which the transistor is not conducting. The "on" time of a transistor in a multivibrator circuit is that time which the transistor is conducting. In a multivibrator circuit, the "off" time of one transistor is for practical purposes the same as the "on" time of the other transistor.

In a preferred embodiment of the present invention a transistor-amplifier unit is inserted in series with the external base resistor of the first of the switching transistors which comprises one side of the free running multivibrator. The transistor-amplifier unit includes a fixed resistance connected in parallel with the transistor. This transistor-amplifier is used to vary the base resistance and consequently the time constant of that half of the multivibrator. The base of the transistor-amplifier is connected to the output load and variations in the output load change the conductivity of the transistor-amplifier. The effective resistance of the amplifier-transistor and its parallel resistance is varied in response to decreases or increases in the value of the regulated output voltage. This effective resistance varies the time constant of one half, or in the example, the first transistor of the multivibrator. When the voltage of the regulated output tends to increase, i.e., becomes more positive, the transistor become less conductive and the effective external resistance of the associated switching transistors of the multivibrator is increased, thereby increasing the time constant of one side of the free running multivibrator causing the ratio of "on" to "off" time of the multivibrator to be less. In this system the length of each period or each pulse when the multivibrator is "on" remains constant but the "off" time between the "on" periods or pulses is varied. Thus, the ratio of the length of the "on" period to the "off" period is varied in accordance with the increase or decrease of the regulated output voltage.

Conversely, when the voltage output decreases, the effective base resistance of that side of the multivibrator having the first transistor decreases and the ratio of "on" to "off" time of the multivibrator increases. Thus, by controlling the ratio of the "on" times versus the "off" times of the free running multivibrator in response to the regulated output, the switching transistors (connecting the unregulated power source through a filter to the load) are similarly controlled and the voltage output from the regulator is maintained at a preset level.

A better understanding of the invention and other objects can be had from the following description taken in conjunction with the drawing which illustrates a circuit diagram of a preferred embodiment of the invention.

The major components of the circuit are blocked out and will be described first. Shown thereon is a DC converter 10 which can be any unregulated DC power supply such as a fuel cell, for example. The output of the DC converter is connected to a series of switching transistors 12. The output of the switching transistors 12 is connected through filter 13 to a load 14.

The regulated output which is connected to load 14 is also connected to a free running multivibrator 16. Multivibrator 16 has a variable resistance unit 54 which is responsive to the regulated output. Variations of resistance in unit 54 control the duty cycle of the multivibrator. Thus, variations in the level of the regulated output determine the amount of the ratio of "on" to "off" time of the free running multivibrator. Free running multivibrator 16 is connected through emitter follower 18 to an amplifier system or unit 20. The output of amplifier system 20 is used to drive a push-pull transformer-driver 22. The push-pull amplifiers of driver 22 are transformer coupled through transformer unit 23 to the base of the switching transistors of switch 12 by multifilar output windings.

Attention will now be directed in greater detail toward the circuits of the various major components. The series of switching transistors 12 include transistors 26, 28, and 30 connected in series. The output of DC converter 10 is connected to the emitter of transistor 26. A capacitor 17 is in a circuit between the positive and negative output terminals of DC converter 10. The output of transistor 30 is connected through an LC filter 13 to load 14. The LC filter includes an inductance 32 and a capacitor 34.

Low pass filter 13 is used to integrate the pulses at the output of the series switches 12. In other words, filter 13 takes the square pulses from switching means 12 and converts it into a relative level voltage. The filtering function of capacitor 34 and inductance 32 is well-known. A diode 36 is provided in filter 13 between the positive side and ground. Diode 36 serves to provide a discharge path for the energy stored in the inductance 32 during the "off" period of the switching cycle.

Attention is next directed toward free running multivibrator 16. The free running multivibrator includes a first switching transistor 38 and a second switching transistor 40. These transistors are illustrated as NPN-type transistors. The collector of transistor 38 is connected through a circuit having capacitor 42 to the base of transistor 40 and likewise the collector of transistor 40 is connected through a second circuit having a second capacitor 44 to the base of transistor 38. The collector of transistor 38 is connected through a circuit having resistor 46 to junction 49. This junction is connected through a second resistance 48 to the positive side of the regulated output. The collector of transistor 40 is connected through resistor 50 to common junction 49. Thus, the collector of each transistor 38 and 40 is connected through resistor 48 to the regulated output.

The base of transistor 40 is connected through a resistor 52 to junction 49. The "off" time for transistor 40 and consequently the "on" time of transistor 38 is controlled by capacitor 42 and resistor 52. The "off" time of a transistor in a multivibrator circuit is that time which the transistor is not conducting; conversely its "on" time is when it is conducting. The base of transistor 38 is connected through a variable resistance unit 54 to junction 49. The "off" time of transistor 38 and consequently the "on" time for transistor 40 is determined by capacitor 44 and the effective resistance of variable resistance unit 54.

Variable resistance unit 54 includes a transistor 56 which, as shown, is a PNP-type which is different from transistors 38 and 40 which are illustrated as type NPN. Shunted across transistor 56 is a fixed resistor 58 and in series with transistor 56 is a fixed resistor 60.

The base drive for transistor 56 is taken from a voltage divider circuit across the regulated line. This voltage divider circuit includes resistors 62, 64 and 66. The base of transistor 56 is connected to resistor 66 by movable contact 68 so that the voltage (or percent of the desired load) applied to the base of transistor 56 can be varied. A Zener or breakdown diode 57 and resistance 48 are connected in series across the output of the regulated voltage. Diode 57 will not conduct until it reaches a certain voltage level. Thus, it maintains a voltage at junction 49 at a constant value independent of the fluctuation of the output voltage at load 14 and thus serves as a voltage reference point for transistor 56.

The signal output of multivibrator 16 is taken at the collector of transistor 40. The "on" time of transistor 38 and the "off" time of transistor 40 are equal and constant (for practical purposes). In other words, each time transistor 38 conducts, it conducts for a period of time which is fixed in duration. The "on" time of transistor 40 and the "off" time of transistor 38 are variable and when either transistor 38 or 40 is "on" the other transistor is "off". Each time transistor 40 conducts, its duration of conduction is dependent upon the variable resistance 54. The duration of the "off" period of transistor 40 is fixed but the frequency of its occurrence is variable. Thus, by controlling the length of the duration of the "on" period of transistor 40, the ratio of the "on"/"off" time of transistor 40 is controlled.

When the voltage on the regulated output tends to decrease, the effective resistance of variable resistance unit 54 decreases and the "off" time of transistor 38 is decreased. This increases the ratio of the "on" to "off" time of transistor 38 but decreases the ratio of "on" to "off" time for transistor 40. This is true because making the base of transistor 56 more negative in relation to its emitter, which is held at a constant voltage by the Zener diode 57, the transistor will conduct more and tends to bypass shunt resistor 58. As shunt 58 is bypassed, the maximum "off" time of transistor 38 (which is a minimum "on" time of transistor 40) is then limited by the size of resistor 60. Resistor 60 sets the maximum "on" to "off" ratio of the multivibrator.

Conversely, when the regulated output voltage increases the effective resistance of resistance means 54 increases and the ratio of the "on" to "off" time of transistor 38 is less. Thus, if the base of transistor 56 is less negative in relation to its emitter it will conduct less, i.e., the period of conductance is shorter. Resistor 58, together with resistor 60, sets the minimum ratio of "on" to "off" time of the multivibrator.

"On" time of the multivibrator is defined as the time when transistor 40 is "off" or nonconducting. Collector of transistor 40, during the "on" time of the multivibrator, is therefore at B+ voltage with respect to ground or the negative side of the load. Thus, when the voltage of the regulated output load decreases the ratio of "on" to "off" time of transistor 40 is increased. However, the ratio of the "on" to "off" time of the multivibrator is greater. Conversely, when the voltage of the regulated output increases, the effective resistance of variable resistance unit 54 increases and the ratio of the "on" to "off" time of the multivibrator is less. As will be seen, the ratio of the "on" to "off" time of the multivibrator controls the ratio of the "on" to "off" time of the switching transistors. Thus, by controlling the ratio of the "on" to "off" time of the multivibrator in response to the decrease or increase of the output voltage, the switching transistors are likewise controlled so that essentially constant voltage output can be maintained.

The asymmetrical square wave signal from multivibrator 16 is fed through emitter-follower 18 to amplifier unit 20. The emitter-follower includes transistor 72, a base resistor 74 and an emitter-resistor 76. The size of the base current limiting resistor 74 is governed by the amplitude of the input signal. The base limiting current resistor 74 limits the base current to a safe value for transistor 72. The size of the emitter-resistor 76 is governed by the desired output impedance of the emitter-follower 18. The emitter-follower is primarily a buffer with a high input impedance and low output impendance to prevent loading of the multivibrator.

The output of emitter-follower 72 is connected to a first amplifier and a second amplifier within amplifier unit 20. The first amplifier in the drawing takes the form of transistor 78 and the second amplifier takes the form of transistor 80. Transistors 78 and 80 are connected in parallel. Transistor 78 has a base resistor 82 in the circuit connecting the base of the transistor 78 to the emitter of transistor 72. Transistor 80 similarly has a resistance 84 in its base circuit. The collector of transistor 78 is connected through resistors 86 and 88 to the positive or power side of the regulated output. The collector of transistor 78 is also connected through a circuit including resistor 86 and a capacitor 90 to the base of transistor 92 within the push-pull transformer-driver 22. The emitter of transistor 78 is connected to ground.

The collector of transistor 80 is connected through fixed resistance 94 to the positive side of the regulated output voltage. The emitter of transistor 80 is connected to ground.

The collector of transistor 80 is also connected to the base of a third amplifier, transistor 96. This circuit includes a resistance 98 and a capacitance 100 which are connected in parallel. The emitter of transistor 96 is connected to ground and its collector is connected through resistors 102 and 104 to the positive side of the regulated output. The collector of transistor 96 is also connected through resistor 102 to capacitor 106 to the base of transistor 108 in the push-pull transformer-driver 22.

A first diode 110 and a second diode 112 are in circuits connecting the base of transistors 92 and 108, respectively, to ground. The purpose of these diodes is to restore the electrical charge on coupling capacitors 90 and 106, respectively, during the "off" time of its associated transistor.

The emitters of the transistors 92 and 108, which are illustrated as PNP-type of the push-pull transformer-driver, are connected by a common circuit to the positive side of the regulated power output of filter 13. This circuit includes a resistance 114 in parallel with capacitor 116. The primary purpose of this resistor-capacitor combination is to provide proper bias for transistors 92 and 108.

Attention will now be directed toward the connection of the push-pull transformer-driver 22 to the transformer section 24. The collector of transistor 92 is connected to one end of the primary winding of the transformer and the collector of transistor 108 is connected to the other end. The center tap 118 of the transformer is connected through resistor 120 to a junction point 123. Junction point 123 is connected to ground or negative side of the output voltage. The bases of transistors 26, 28 and 30 are connected to secondary windings of the transformer 24 by trifilar output windings. Each half of the primary winding of the transformers is provided with damping resistors 122 and 124 and by capacitors 126 and 128. Capacitors 126 and 128 are used to improve the shape of the output waveform.

The output of multivibrator 16 is connected through amplifier unit 20 and transformer-driver 22 to transformer unit 23 in proper polarity so that any decrease in the regulated output voltage will cause the ratio of "on" time to "off" time of the switching transistor unit 12 to become greater. Conversely, any increase in the regulated output voltage will cause the ratio of "on" time to "off" time to become less.

Means are also provided to prevent damage to the switching transistors 26, 28 and 30 from over-voltages, etc. These means include the Zener diodes 130, 132, and 134 shunting respectively transistors 26, 28 and 30.

A circuit 131 having a starting switch 133 bypasses or shunts the switching transistors. Switch 133 is preferably a spring-loaded, normally open switch. The circuit also includes a current-limiting resistor 135. The purpose of circuit 131 is for momentary use in starting the voltage regulator.

A switching circuit voltage regulator as illustrated in the drawing and in accordance with this invention was constructed and had an operating efficiency of better than 90%. A list is submitted below of various circuit components identified above, with indications of the values and other identifying data of the elements used for such components. The invention, of course, is not limited to these components.

| Component | Value |
|---|---|
| Resistor 48 | ohms 330 |
| Resistors 46, 50, 76, 88, 104, 122 and 124 | do 1K |
| Resistor 52 | do 43K |
| Resistor 58 | do 270K |
| Resistor 60 | do 33K |
| Resistor 62 | do 10K |
| Resistor 66 | do 5K |
| Resistor 64 | do 6.8K |
| Resistor 74 | do 2.2K |
| Resistors 82, 84 and 98 | do 4.7K |
| Resistors 86 and 102 | do 2K |
| Resistor 94 | do 3K |
| Resistor 114 | do 10 |
| Resistor 135 | do 620 |
| Capacitors 42, 44, 126 and 128 | farads .005 |
| Capacitor 100 | do .05 |
| Capacitor 17 | microfarads 200 |
| Capacitor 116 | do 1000 |
| Capacitor 34 | do 1500 |
| Capacitors 90 and 106 | microfarads 16 |
| Transistors 26, 28 and 30 | Type 2N1907 |
| Transistors 92 and 108 | Type 2N1906 |
| Transistors 38, 40 and 72 | Type 2N1304 |
| Transistor 56 | Type 2N1305 |
| Transistors 78, 80 and 96 | Type 2N697 |
| Zener diodes 130, 132 and 134 | IN2828B |
| Zener diode 57 | IN1594 |
| Diode 36 | IN1125 |
| Diodes 110 and 112 | IN90 |

The above components were used in a voltage regulator connected to an unregulated DC converter having a voltage output of around 100 volts to obtain a regulated output of 25 volts.

In operation, before starting the device, pointer 68 is set at the proper position on resistor 66 to obtain the desired regulated output of 25 volts, for example. The regulated output can be changed by changing pointer 68 of variable resistor 66. After resistor 66 has been adjusted, starting switch 133 is momentarily closed. This provides a voltage to start multivibrator 16. The free running multivibrator 16 has a nominal frequency of about 3 kilocycles. The value of this is not critical. Transistor 56 in the base return of transistor 38 acts as a variable resistor. The base drive signal for transistor 56 is taken from the voltage divider circuit at pointer 68 across the regulated line or output. When the voltage on the regulated output tends to increase, the effective resistance of transistor 56 increases and the ratio of "on" time to "off" time of the multivibrator is less. The output of multivibrator 16 is connected through amplifier unit 20 and transformer-driver 22 to transformer 23 in proper polarity so that any increase in the regulated output voltage as reflected by an increase in the ratio of "on" to "off" time of the multivibrator will cause the ratio of "on" time to "off" time of the switching transistors to become less so that the integrated output of filter 13 decreases. By increasing the ratio of "on" to "off" time of the multivibrator, the ratio of "on" to "off" time of switches 12 decreases. Thus, the total energy permitted to pass through switches 12 is decreased and when this is integrated it results in a lower regulated output voltage. This compensates for the increase of voltage detected by the transistor 56. Conversely, a decrease in the voltage of the regulated output causes the effective resistance of the transistor 56 to decrease and accordingly modifies the ratio of "on" to "off" time of the multivibrator.

The output of the multivibrator 16 is taken from the collector of transistor 40. This output is fed into the base of transistor 72. The transistor 72 is used to isolate the multivibrator from the following stages to prevent any interference in the running of the multivibrator by loading its output. The output from emitter-follower 72 is fed into the base of transistors 78 and 80 which are amplifiers. The signal from amplifier 78 is taken from a voltage dividing junction between resistors 86 and 88 through a capacitor 90 to the base of driving transistor 92.

The signal from transistor 72 which serves as an emitter-follower is also fed to the base of transistor 80 which is an amplifier similarly as is transistor 78. The amplifiers 78 and 80 give the signal a phase inversion or reversal of 180°. The output of transistor 80 is used to feed transistor 96, which is also used as an amplifier. Amplifier 96, being identical to amplifiers 78 and 80, also give another 180° phase inversion, therefore, the output of transistor 80 is 360° inverted from the output of the emitter-follower, whereas the output from transistor 78 is inverted only 180°, thus, there is a difference of 180° between the input to the base of transistor 92 and the input to the base of transistor 108 which receives the output of transistor 96. Thus, push-pull transformer 24 drives switches 26, 28 and 30 simultaneously opened or closed. The reversal of current through primary winding and switching transistor permits nearly square-wave action of the switching transistors. In other words, they are turned "off" and "on" to have a throughput or not to have a throughput nearly instantaneously.

There are many advantages to the system of this invention. For example, it can operate at a very high efficiency. The transformer connections eliminate power loss encountered in usual resistance-type connections. The system provides overload and surge protection. The voltage regulating circuit permits the system to deliver power at a constant voltage output of a preset limit. If too great a demand for power is made, the system will not respond beyond the preset limit, thus protecting the primary power generating system. For example, the maximum "on" time of the multivibrator is limted by the resistor 60 and the minimum "on" time is limited by resistors 58 and 60. Zener diodes 130, 132, and 134, respectively, protect transistors 26, 28, and 30 from excessive transient voltage.

This system also provides short circuit protection. In the event of a direct short circuit in output load, the system immediately shuts down as the system no longer has power. This protects the power generating system from destructive overloads.

The transformer connection between the push-pull transformer-driver and the switching transistors also gives many advantages. For example, it isolates the high voltage circuit from the regulating circuit. This allows the use of relatively inexpensive low voltage transistors in the regulating system, that is, in the free running multivibrator 16 and in the amplifier section 20. Also the trifilar wound secondary transformer windings insure that the series switching transistors are all switched at the same instant. The stand-off voltage of each of the switching transistors 26, 28 and 30, therefore, is the input voltage divided by the number of series switching transistors. If a higher input voltage is necessary at the source, more windings and series transistors can be added. The base of each series switching transistor is connected to its respective emitter through a secondary transformer winding. During the "off" period the base is therefore shorted to the emitter by the low D.C. resistance of the winding. The transistor is then capable of standing off a voltage equal to its maximum break-down voltage.

It will be apparent to persons skilled in the art that many modifications of this invention are possible without departing from the spirit and scope thereof. Therefore, it is intended that the invention not be limited to the specific examples presented. It is therefore desired that only such limitations be imposed on the appended claims as are stated therein.

What is claimed is:

1. A voltage regulator for controlling the voltage to a load from a D.C. supply which comprises:
    a plurality of switching transistors connected in series;
    a switching transformer, one side of said transformer being multifilar wound, there being a winding for and connected independently between the base and emitter of each switching transistor;
    integrating means connected to the output of said switching transistors for providing a regulated output signal;
    a multivibrator;
    means to control the ratio of the "on"/"off" time of said multivibrator in response to variation in the regulated output signal; and
    means for driving said switching transformer with the output of said multivibrator.

2. An apparatus as defined in claim 1 including a series of break-down diodes connected in parallel to said plurality of switching transistors, the break-down point of said diodes being less than the break-down of said switching transistors.

3. An apparatus as defined in claim 2 in which said integrating means include an inductance means in series between the switching transistors and the load; a capacitance between one end of the inductance means and ground; and a diode between the other end of the inductance means and ground.

4. A voltage regulator for controlling the voltage to a load from a D.C. supply which comprises:
    a plurality of switching transistors connected in series;
    a switching transformer means, one side of said transformer means having an independent winding connected between the base and emitter of each switching transistor with such windings being multifilar wound;
    filter means connected to the output of said switching transistors for providing a regulated output signal;
    a multivibrator having a first multivibrator transistor and a second multivibrator transistor;
    means connecting the emitter of said first multivibrator transistor and said second multivibrator transistor to the output voltage;
    a fixed time-constant circuit connected to the base of said second multivibrator transistor;
    a time-constant circuit comprising series connected resistance means and capacitance means connected to the base of said first multivibrator transistor and having a means for varying the resistance means of such time-constant circuit in accordance with the voltage level of the output voltage from said filter means; and
    means for driving said transformer winding with the output of said multivibrator.

5. A voltage regulator for controlling the voltage to a load from a D.C. supply which comprises:
    switching means including a plurality of transistors connected in series;
    a switching transformer, the independent windings of one side of said transformer connected between the base and emitter of each switching transistor, such windings being multifilar wound;
    integrating means connected to the output of said switching means for providing a regulated output signal; and
    means to drive said switching transformer in one direction and then the other, the period of driving in one direction varying in response to the variations in the regulated output signal.

6. An apparatus as defined in claim 5 including a series of break-down diodes connected in parallel to said switching means, the sum of the break-down voltage of said diodes being less than the break-down voltage of said switching means.

References Cited

UNITED STATES PATENTS

| | | | |
|---|---|---|---|
| 3,076,925 | 2/1963 | Jackson | 323—22 |
| 3,153,187 | 10/1964 | Klees | 323—22 |
| 3,160,807 | 12/1964 | Packard | 323—22 |
| 3,286,157 | 11/1966 | Leostic | 323—22 |
| 3,305,767 | 2/1967 | Beihl et al. | 323—22 |

JOHN F. COUCH, *Primary Examiner.*

A. D. PELLINEN, *Primary Examiner.*